United States Patent [19]

Żmójdzin et al.

[11] 3,919,223

[45] Nov. 11, 1975

[54] METHOD OF PRODUCTION OF QUINOXALINE, OBTAINED PARTICULARLY FROM NOT PURIFIED RAW MATERIALS

[75] Inventors: Andrzej Żmójdzin; Bogusław Hoffman, both of Poznan, Poland

[73] Assignee: Chemiczna Spoldzielnia pracy "Synteza", Poznan, Poland

[22] Filed: May 29, 1973

[21] Appl. No.: 364,404

[30] Foreign Application Priority Data

June 8, 1972 Poland .............................. 155864
May 26, 1972 Poland .............................. 156675

[52] U.S. Cl. ........................ 260/250 Q; 260/250 Q
[51] Int. Cl.² ................................. C07D 241/36
[58] Field of Search ............................. 260/250 Q

[56] References Cited
FOREIGN PATENTS OR APPLICATIONS
52,312    0000    Poland

OTHER PUBLICATIONS

Cavagnol et al., J. Am. Chem. Soc., 69,795, (1947).

Simpson, Heterocyclic Compounds 1953, p. 203, pp. 228–231.

*Primary Examiner*—Donald G. Daus
*Assistant Examiner*—David E. Wheeler
*Attorney, Agent, or Firm*—Haseltine, Lake & Waters

[57] ABSTRACT

Quinoxaline is prepared in high purity and yield by condensing at least 6% by weight of glyoxal with at least 11% by weight of o-phenylenediamine in aqueous solution in the presence of alkali metal salts of weak acids. A crude solution of glyoxal containing weak acids formed during the preparation of glyoxal by oxidation of paraldehyde or acetaldehyde with nitric acid is the preferred starting material.

12 Claims, No Drawings

METHOD OF PRODUCTION OF QUINOXALINE, OBTAINED PARTICULARLY FROM NOT PURIFIED RAW MATERIALS

BACKGROUND OF THE INVENTION

The invention relates to improvements in a process of preparing quinoxaline by means of the reaction between o-phenylenediamine and glyoxal.

The classical methods of synthesis, which are described in the literature (Organic Synth. Coll. Vol. IV—824-827), in order to avoid side-reactions are based on the production first of 1,2-dihydroxyethane-1,2-disulfonic acid from glyoxal and the bisulfite of an alkali metal or of an alkaline earth metal and then subjecting the 1,2-dihydroxyethane-1,2-disulfonic acid to a condensation with o-phenylenediamine. The disadvantage of this process is that it requires a lot of different auxiliary operations such as precipitation of the compound of glyoxal and bisulfite, filtering this compound, if necessary drying this product, as well as a previous purifying of the glyoxal solution etc. Moreover it is necessary to use a supplementary raw material bisulfite, mostly sodium bisulfite. Further it is necessary to carry out this reaction using diluted solutions, so that after condensation the concentration of quinoxaline obtained is no greater than 7.5% (generally 4-7%). Attempts to carry out this reaction by employing more highly concentrated solutions have failed, because an intermediate compound, namely a derivative of tetrahydroquinoxaline, caused coagulation of the whole reaction mass and rendered the carrying out of the reaction impossible.

The process elaborated by the applicant, consisting in the condensation of o-phenylenediamine with glyoxal in a water solution in the presence of sodium carbonate is already known. This process enables the use of unpurified glyoxal as a raw material, even of a solution which in a known way is obtained by means of oxidation of paraldehyde or acetaldehyde with nitric acid and which contains glyoxal in addition to several other compounds, particularly organic acids. In this known method the reaction mixture has however, been diluted by introduction of water or of aqueous solutions, in such a quantity that the final desired concentration of the product at the end of the reaction is obtained as in the classic process, giving a final solution which contains a maximum of no more than about 10% of the quinoxaline. The subsequent separation of the product is performed in an analogous way to that described in Polish Pat. No. 52,312.

It is to be pointed out, that quinoxaline is very soluble in water, particularly in cold water, whereas its solubility diminishes with increasing temperature. It has been known that quinoxaline precipitates from water solutions when sodium hydroxide is added but such a precipitation is, however, very disadvantageous and expensive. The isolation of quinoxaline by means of extraction with organic solvents is similarly troublesome and expensive. The same applies to a combination of both processes. The known method, elaborated by the applicant, consists in the addition at elevated temperature of sodium carbonate in such a quantity, that the concentration of the same is higher than that of a saturated solution at ordinary temperature and then in the separation of the two liquid phases in the warm state. This method, however, also requires the use of additional raw material and has some disadvantages, such as e.g. the separation into two layers is accompanied by difficulties, when dark solutions and particularly when emulsions developed. These disadvantages occur especially when a stoichiometric excess of glyoxal is present.

SUMMARY OF THE INVENTION

According to this invention it has been found that all these disadvantages can be avoided, when the condensation is performed in the presence of salts of alkali metals of weak acids, preferably sodium carbonate, in a solution which at the outset contains more than 1 mol of each of the reagents per liter, i.e., at least 11% by weight of o-phenylenediamine and 6% by weight of glyoxal, which gives a solution containing not less than 13% of quinoxaline. Unexpectedly, in employing this method there has proven to be no formation of hard to dissolve derivatives of tetrahydroquinoxaline which could precipitate. Thus an obvious advantage is attained, namely a significant decrease of the volumes of the treated solutions. It is preferred to carry out this process employing much higher concentrations in order to obtain, after the reaction, a mixture containing quinoxaline in concentrations in the range of 20-40% by weight and it is possible even to use still more concentrated solutions.

An extremely simple and easy method for carrying out this invention has been particularly developed, in which raw materials in the solid state, first sodium carbonate and then o-phenylendiamine are added one after another to the glyoxal solution. An addition of water and also of other neutral substances or the introduction of water with one of these raw materials, e.g. in the form of a solution, does not limit, however, the nature of this invention when the total concentration of the reaction solution corresponds to the cited and claimed limits.

In industrial production it is particularly advantageous and convenient to carry out the process according to this invention using an unpurified solution of glyoxal directly. As known, when preparing glyoxal according to the existing processes by means of oxidation of acetaldehyde or paraldehyde with nitric acid, a solution is obtained which contains about 11-19%, on the average about 15% of glyoxal and approximately 30% of other compounds, mainly organic acids. Without going through long and onerous purification and without dilution, this solution can be directly used for condensation according to this invention.

In industrial practice is suffices to add to such a solution first the anhydrous sodium carbonate, until effervescence of the solution ceases and $CO_2$ ceases to form and then the dry o-phenylenediamine. Unexpectedly it turned out that in the thus prepared reaction solutions, the quinoxaline is isolated at once without the necessity of adding any other substances. According to the temperature, quinoxaline is fully isolated either in the liquid state or, at lower temperatures, in the solid state.

In industrial practice, it has proved to be particularly convenient to cool the solution obtained after condensation with continuous stirring of the solution, whereby the obtained suspension of quinoxaline crystals is filtered from the mother liquor or centrifuged. It should be pointed out that the isolation is so complete, that the method according to this invention can even be employed for the quantitative determination of o-phenylenediamine. Research has proved that this is due to the composition of the condensed solution, which at high concentrations contains above 30%, even about 40% of salts of alkali metals of organic acids, which causes a lowering of the solubility of quinoxaline to zero.

On the other hand, it is particularly advantageous that the salt formed in the process according to the invention are particularly perfectly soluble and, notwithstanding the high concentration, that they do not crystallize out on cooling the solution. Owing to this, quinoxaline is not contaminated by isolated salts, which could not previously be avoided when using known methods. Under such conditions, particularly the centrifuged product, considered as a raw material, contains exceptionally low quantities of impurities.

When, on the contrary, the content of alkaline salts is too low in the solution, i.e., below 15% or 20% by weight, quinoxaline will partly remain in solution or be only partly isolated. This can occur, particularly when a purified glyoxal solution or a partly purified one is used for the condensation, or in the case of concentrating and then diluting the glyoxal solution with water. Research proved that, in such cases, it is also possible to isolate quinoxaline according to the method of the invention, but it is necessary to complete the quantity of salts contained in the solution, namely by addition to the condensed mixture of readily soluble alkaline salts, particularly of ones such as sodium acetate, sodium formate, sodium nitrate, etc. The main advantage of the process according to this invention consists in the maximum of simplicity in the production, which in industrial conditions excludes in practice the possibilities of mistakes. It should be pointed out, that until now, the condensation of quinoxaline was a very complicated, onerous and difficult process requiring work and a very high precision in carrying out the process, i.e., requiring a very exact composition of the reagent proportions, employing very onerous analyses and occasionally experimental condensations, whereby inaccuracies produced an appreciable lowering of the output or the obtaining of highly contaminated products. The method of the invention further enables the manufacturing of quinoxaline with a very low quantity of impurities in a single treatment, starting from very impure raw materials and particularly directly from unpurified solutions, which have been obtained by oxidation of acetaldehyde with nitric acid and which contain glyoxal, in addition to a number of other compounds. It is further particularly to be pointed out that the very impurites which are contained in such a solution, contribute to the isolation of quinoxaline from the condensed solution in a pure form and practically in a quantitative yield. The process of the invention renders possible an appreciable diminution of the quantities of the treated solutions as well as a limitation of waste water. The production requires only a very simple and smaller installation of equipment, whereby an additional advantage is also that, owing to the slightly alkaline reaction and to the non-corrosive medium, an apparatus made of common steel, even of wood may be used. Finally the process according to this invention can be carried out even with the aid of unskilled workers and more quickly than was possible until now. Further, the substances employed in this process as well as the resulting waste water are not corrosive nor dangerous.

DESCRIPTION OF THE PREFERRED EMBODIMENTS

The condensation reaction, as well as the method of isolating quinoxaline from the condensed solutions, are broadly described in the following examples, which are not intended to limit the scope of this invention.

EXAMPLE I

To a reaction vessel of stainless steel, which is provided with a stirring device, were charged 140 l of an unpurified solution which was obtained by oxidation of paraldehyde with nitric acid, according to Polish Pat. No. 57,126, and which contained about 18% of glyoxal and about 27% of other oxidized products, mainly organic acids. To this solution there were introduced one after another, with continuous stirring, anhydrous sodium carbonate (until effervescence of the solution and formation of $CO_2$ ceased) in a total amount of about 40 kg and thereafter 54 kg of o-phenylediamine. The solution was stirred for 2 hours, whereby the temperature as a result of the exothermic reaction rose to about 60°C. From the condensed mixture, quinoxaline was isolated by warming to 70°C. Thereafter an additional 10 kg of anhydrous soda were added and after keeping this mixture undisturbed for 2 hours, and after separation into a lower aqueous layer and an upper organic layer, quinoxaline was isolated. There were obtained 60 kg of quinoxaline with a melting point of 28°–30°C. in a dark color corresponding to a yield of about 90% of the theoretical.

EXAMPLE II

To a reaction vessel of 800 l capacity made of ordinary steel, which was provided with a stirring device, there were charged 80 l of a 20% sodium carbonate solution and to this solution there were added at the same time anhydrous soda as well as 140 l of an unpurified solution of glyoxal as in Example I. Finally there were added 2 kg soda (total amount about 40 kg), checking to see that the solution at the end had ceased to be effervescent. Thereafter 54 kg of technical o-phenylenediamine were added to this solution which was stirred for one more hour, whereby the temperature rose to 60°C and then gradually declined. The quinoxaline was isolated in a known manner, namely by extraction with 100 kg of benzene. After evaporation of the benzene there were obtained 64 kg of dark colored quinoxaline, with a melting point of 29°–30°C, corresponding to about 98% of the theoretical yield.

EXAMPLE III

To 140 kg of an unpurified glyoxal solution as in Example I, contained in a reaction vessel, which was provided with a cooling jacket and a stirring device, soda was gradually added to this mixture for neutralization until cessation of the violent reaction which was accompanied with effervescence of the solution and formation of $CO_2$. A total of 40 kg of soda were used. To this solution 54 kg of o-phenylenediamine were added and the mixture was stirred for 30 minutes, whereby during the first 10 minutes the temperature rose to about 55°C. The solution was cooled to about 18° C with continuous stirring and the suspension of quinoxaline crystals in the mother liquor was centrifuged. There were obtained 72 kg of a wet product, containing more than 90% of quinoxaline, with a melting point of 29°–30°C, corresponding to a theoretical yield of over 99%.

EXAMPLE IV

To a vessel made of wood of 1 l capacity, there were charged, one after another 500ml water, 15 g sodium carbonate, 59 g glyoxal, in the form of a 40% solution, as well as 108 g o-phenylenediamine. This mixture was stirred for 30 minutes and then 130 g of sodium carbonate were added and the solution maintained undisturbed for a day. The water solution was poured off, and the solid crust composed of hard crystalline quinoxaline in the form of needles was centrifuged. There were obtained 145 g of a wet product, from which, after distribution, 127 g of pure hard quinoxaline were obtained with a melting point of 29°–30°C (with a very small amount of residue remaining in the distillation flask). This corresponds to a yield of about 97% of theory.

EXAMPLE V

After condensation as in Example IV, there were added to the solution 200 g of sodium nitrate and the solution was cooled to 15°C. There were obtained 147 g of a wet product, which contained 130 g of quinoxaline, corresponding to the theoretical yield.

We claim:

1. A method for the preparation of quinoxaline consisting essentially of reacting glyoxal and o-phenylenediamine in aqueous solution in a concentration of at least 6 weight % of glyoxal and 11 weight % o-phenylenediamine in the presence of at least one soluble alkali metal salt selected from the group consisting of alkali metal carbonates, nitrates, acetates and formates in an amount sufficient to cause the formed quinoxaline to become insoluble in the reaction mixture but not enough to cause precipitation of the alkali metal salt upon cooling of the reaction mixture.

2. The method of claim 1 wherein the alkali metal salt is sodium carbonate.

3. The method of claim 1 wherein the reaction mixture contains at least 13% by weight of quinoxaline.

4. The method of claim 1 wherein the glyoxal is crude glyoxal obtained by oxidation of paraldehyde or acetaldehyde with nitric acid.

5. The method of claim 2 wherein sodium carbonate is first added in solid form to an aqueous solution of glyoxal, followed by the addition of solid o-phenylenediamine.

6. The method of claim 5 wherein the glyoxal solution is crude glyoxal obtained by oxidation of paraldehyde or acetaldehyde with nitric acid and the sodium carbonate is added until effervescence ceases.

7. The method of claim 1 wherein the quinoxaline is isolated by cooling the reaction mixture.

8. The method of claim 7 wherein the cooling is carried out with continuous stirring to a temperature of from about 28° C. to −10°C. to form crystalline quinoxaline and separating the crystalline quinoxaline by filtering or centrifuging.

9. The method of claim 8 wherein the temperature is between 20°C. and 10°C.

10. The method of claim 1 wherein the concentration of alkali metal salt is at least 15% by weight.

11. The method of claim 10 wherein the concentration is at least 20% by weight.

12. The method according to claim 1 wherein the concentration of starting reactants is chosen so that the concentration of quinoxaline in the postreaction mixture will be from 20 to 40% by weight.

* * * * *